Oct. 12, 1926.

W. E. DIERKS

STOCK WATERING DEVICE

Filed April 27, 1925

1,602,606

Inventor,
Waldo E. Dierks

Patented Oct. 12, 1926.

1,602,606

UNITED STATES PATENT OFFICE.

WALDO E. DIERKS, OF WATERLOO, IOWA.

STOCK-WATERING DEVICE.

Application filed April 27, 1925. Serial No. 26,215.

One object of my invention is to provide a means for heating the water in the drinking bowl of a stock watering device at a point near the highest water level in the drinking bowl.

Another object of my invention is to provide a means of keeping the water in the conduit, connecting a stock watering device to the source of water supply, from freezing in extremely cold weather.

Another object of my invention is to provide a means for utilizing the surplus heat in a stock watering device to heat the water at the source of supply to a stock watering device.

Another object of my invention is to provide a stock watering device which will have the above-named characteristics and which is constructed in such a manner as to permit the drinking bowl, valve float chamber, and the conduit to the source of water supply to be heated, whereby to maintain a temperature of the water therein above the freezing point during extremely cold weather; and the construction of which will further facilitate the caring for heating elements, and provide means for the proper operation of heating elements.

In addition to the foregoing, this invention comprehends improvements in the details of construction and arrangement of parts to be hereinafter described and particularly set forth in the appended claim.

Figure 1:
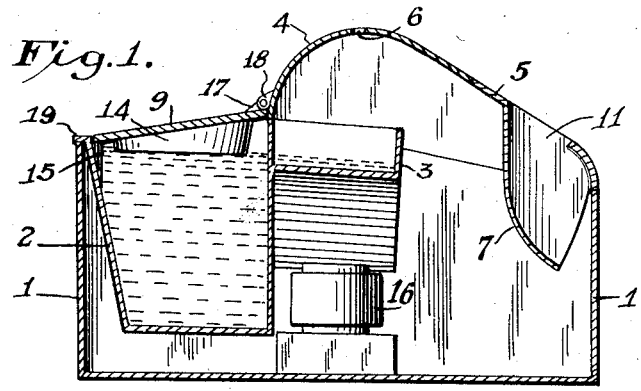
Figure 2:
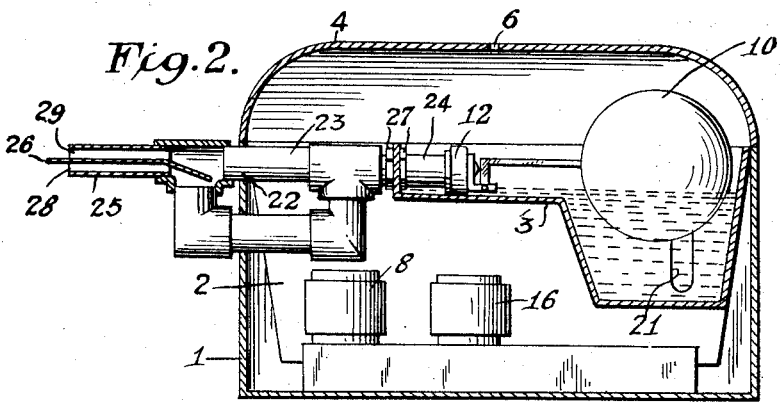
Figure 3:
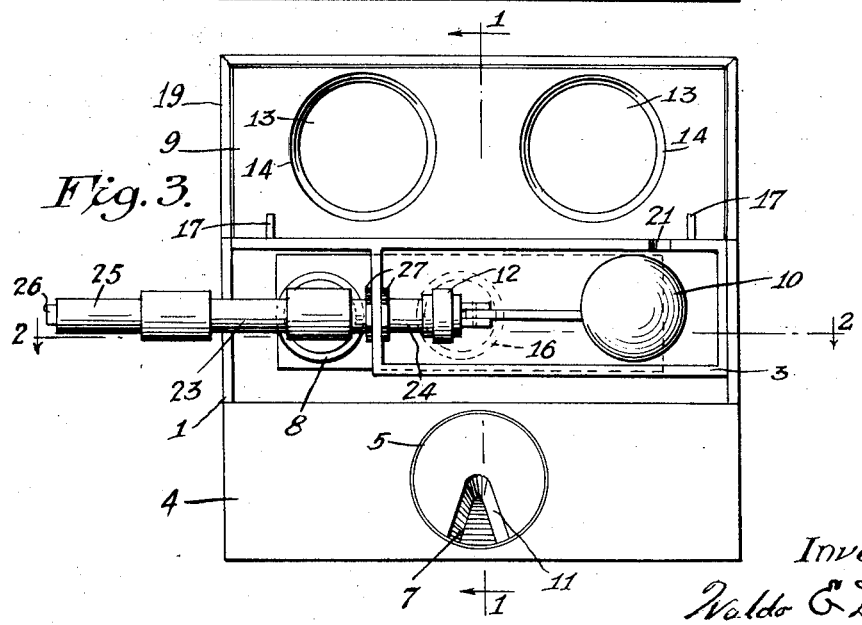

In the accompanying drawings, in which similar and corresponding parts are designated by the same characters of reference, throughout the several views in which they appear:

In the drawing Figure 1 is a section taken on the line 1—1 Fig. 3, Fig. 2 is a section taken on the line 2—2 Fig. 3, and Fig. 3 is a plan view of the stock watering device with a section of the cover, inclosing heating chamber, removed.

As shown in Fig. 1, the stock watering device consists essentially of an outer casing 1 carrying therein the combined drinking bowl 2 and valve float chamber 3.

A cover 4 is provided to inclose the heating compartment of the stock watering device.

Element of heating 16 provides direct heat for valve float chamber 3. Water in the valve float chamber 3, when heated, will circulate to the drinking bowl 2 through slot 21 as shown in Fig. 2 and Fig. 3.

Cover 4 has a small cover 5 positioned therein which may be lifted out to faciliate caring for heating elements 8 and 16. Small cover 5 is provided with an aperture 11 having a flange 7 extending downwardly for the purpose of allowing air to be admitted to the elements of heating 8 and 16, to support the combustion of fuel and to break the direct draft of air and to conduct the air downwardly. Cover 4 has a small aperture 6 therein to allow the products of combustion to pass therethrough.

A cover 9 is provided for the drinking bowl 2, which cover has two openings 13 therein of suitable size for drinking access of stock, as shown in Fig. 1 and Fig. 3.

Openings 13 in cover 9 have flanges 14 extending downwardly, in order to protect the water under cover 9 from free circulation of air.

Drinking bowl 2 is provided with a rest 15 for cover 9 as shown in Fig. 1.

Cover 4 and cover 9 are provided with hinges 17 and 18 allowing either cover to be raised independently of the other.

In Fig. 2 is shown casing 1 with combined drinking bowl 2 and valve float chamber 3 in position. Drinking bowl 2 is provided with a flange 19 which acts as a rest. Element of heating 16 is shown in position under valve float chamber 3 and element of heating 8 is shown in position under conduit 22. Conduit 22 and conduit 23 are connected in such a manner as to form a continuous passageway for water. Conduit 22 and conduit 23 are connected to a branch conduit 24 which enters the valve float chamber 3 through the slot 20 and is fixed thereto by means of lock nuts 27. The flow of the water to drinking bowl 2 is regulated by a valve 12 and float 10, which is connected to the branch conduit 24. Conduit 22 and conduit 23 are connected to the source of water supply by a second branch conduit 25. Branch conduit 25 has a partition 26 positioned therein in such a manner as to form two separate passageways for water, 28 and 29. Passageway 29 has a higher relative position to passageway 28.

Water in conduit 22 when heated will circulate upward to conduit 23 and therethrough to the upper passageway 29 in branch conduit 25 to the source of water supply. This water will be replaced by water from the source of supply circulating through lower passageway 28 of branch conduit 25, to conduit 22. By the continual circulation of water, the water in branch conduit 25 will be kept from freezing in extremely cold weather.

Furthermore the water at the source of supply will be heated to a degree depending upon the size of heating elements used for that purpose.

In Fig. 1 and Fig. 2, it is shown how the valve float chamber 3 is constructed and combined integrally with drinking bowl 2 so as to permit element of heating 16 to be positioned thereunder so that heat may be applied at a point which will be near the highest water level in drinking bowl 2.

While I have illustrated and described my invention with some degree of particularity, I realize that in practice various alterations therein may be made; and I therefore reserve the right and privilege of changing the form of the details of construction, or otherwise altering the arrangement of the correlated parts without departing from the spirit of the invention or the scope of the appended claim.

Having thus described my invention, what I claim as new and desire to secure by Letters Patent is:

In a stock watering device the combination of an outer casing carrying a combined drinking bowl and float valve chamber, a plurality of conduits interconnected with each other and forming a continuous water passage, a branch conduit adapted to be connected to a water supply, a partition within the conduit forming two separate water passages, heating elements positioned under the said float valve chamber and the conduits, a cover in the drinking bowl, drinking openings within the cover, flanges extending downwardly within the openings, a cover in the outer casing, an aperture within the cover, another larger aperture within the cover, a cover for the larger aperture, an opening within the last mentioned cover, a downwardly extending flange within the last mentioned opening, and a float controlled valve to regulate the water level in the drinking bowl.

WALDO E. DIERKS.